Jan. 8, 1952     G. A. OLOFSSON ET AL     2,581,695
WEIGHING MACHINE
Filed Aug. 11, 1947
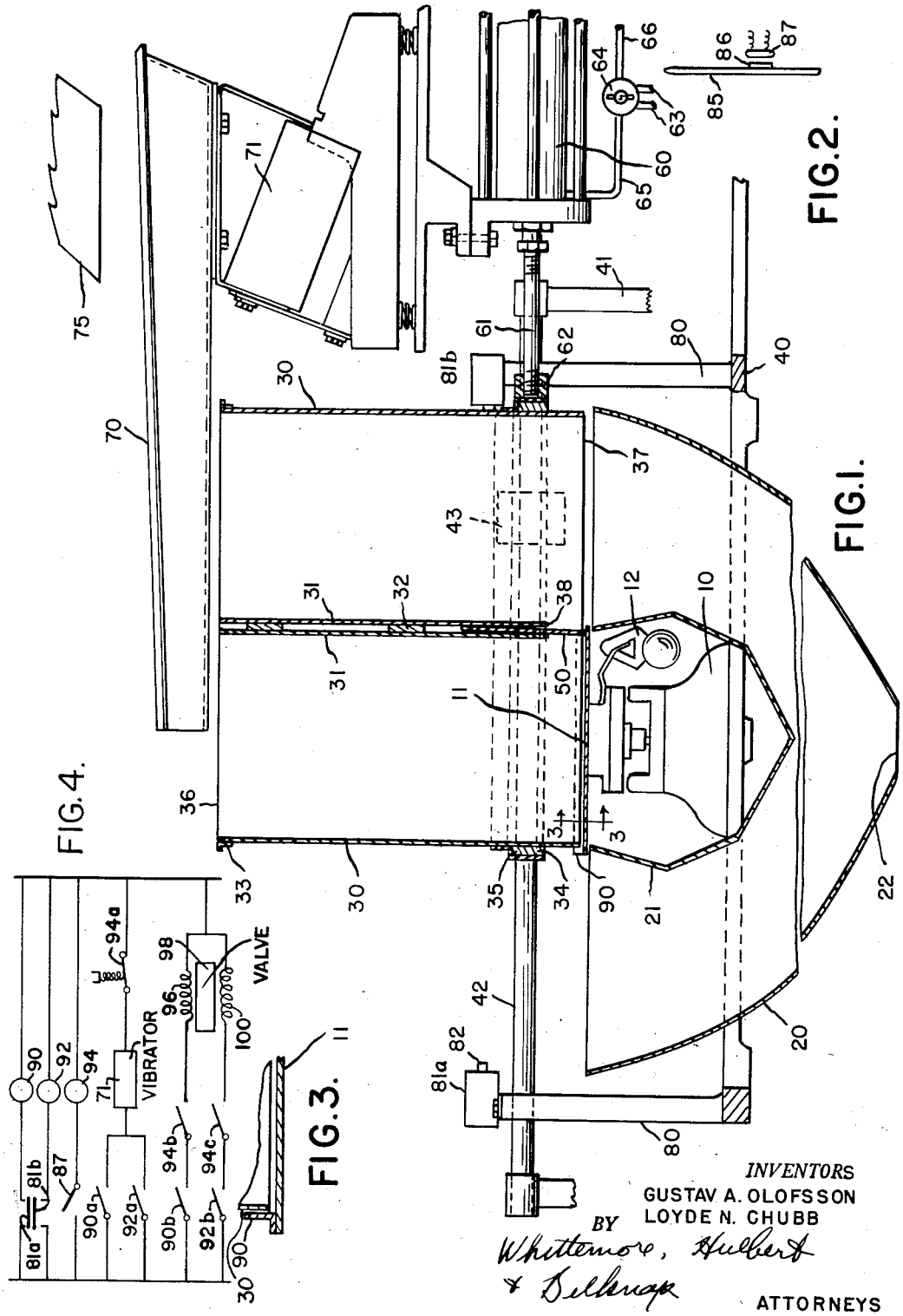
INVENTORS
GUSTAV A. OLOFSSON
LOYDE N. CHUBB
BY
Whittemore, Hulbert
& Belknap
ATTORNEYS Patented Jan. 8, 1952

2,581,695

UNITED STATES PATENT OFFICE 2,581,695

WEIGHING MACHINE

Gustav A. Olofsson and Loyde N. Chubb, Lansing, Mich., assignors to Olofsson Tool & Die Company, Lansing, Mich., a corporation of Michigan Application August 11, 1947, Serial No. 767,944

17 Claims. (Cl. 249—23)

The present invention relates to a machine for weighing predetermined amounts of bulk material.

It is an object of the present invention to provide a weighing machine of the type described in which the material to be weighed is deposited directly onto the platform of a weighing scale.

It is a further object of the present invention to provide a weighing machine including a weighing scale which receives the bulk material directly and which supports no part of the material supporting structure with the exception of a light scraper blade.

It is a further object of the present invention to provide a weighing machine including means for depositing material on a platform of a scale at a controlled rate, for discontinuing deposit of material when a predetermined weight has been attained, and for thereafter scraping the material off the scale at an independently controllable rate.

It is a feature of the present invention to provide in combination with a weighing scale, a pair of laterally movable, interconnected open-bottom buckets which are located above and out of contact with the scale so as to support bulk material on the scale and to scrape a weighed amount of bulk material from the scale.

Other objects and features of the invention will become apparent as the description proceeds, especially when considered in conjunction with the accompanying drawings, wherein:

Figure 1 is a fragmentary side elevation, partly in section, of the improved weighing machine;

Figure 2 is a detail view of the pointer actuated switch mechanism;

Figure 3 is a fragmentary enlarged section on the line 3—3 of Figure 1; and

Figure 4 is a simplified wiring diagram of the mechanism.

Referring now to the drawings, there is indicated a weighing scale 10 having a flat horizontal platform 11 and including an adjustable counterbalancing weight 12 by means of which the scale may be set to measure predetermined weights of bulk material.

Surrounding the scale 10 is a hopper 20 which includes a housing structure 21 for enclosing the scale so as to prevent entry of foreign matter therein. The lower portion of the hopper 20 is open as indicated at 22 and may be connected to a spout of suitable design to effect discharge of weighed quantities of bulk material into containers.

Located above the plane of the platform 11 are a pair of buckets 30, these buckets being formed of sheet material and each being substantially rectangular in cross section. The adjacent walls 31 of the buckets are spaced apart, spacers 32 being provided for this purpose. The two buckets 30 are united together by a light angle piece 33 and by a bar 34 which surrounds the two buckets and is associated with a light piece of sheet metal 35, as indicated in the figures. A supporting frame, indicated generally at 40, is provided and includes posts 41 between which are supported a pair of guide bars or rails 42. Suitable means such as bushings embracing the guide bars 42 are provided on the bucket assembly, one such being diagrammatically indicated at 43. This arrangement provides for independent support of the bucket structure so that neither of the buckets 30 in operation come into contact with the platform 11 of the scale.

The buckets are open at their top as indicated at 36, and are open at their bottom as indicated at 37. In addition, the inner walls 31 of the buckets 30 terminate as indicated at 38 at a point above the bottom edges of the remaining walls of the buckets.

Loosely received in the space between the walls 31 is a scraper blade 50, which may conveniently be formed of a light metal, such for example as aluminum. The thickness of the blade 50 is substantially less than the space between the plates 31 so that as the buckets 30 are moved transversely to the right and left as seen in Figure 1, the blade 50 inclines accordingly. This rocking movement or shifting of the blade 50 serves to prevent lodging of the bulk material being weighed in the space between the walls 31.

Means are provided for effecting lateral movement of the buckets 30 to the right and left as seen in Figure 1. In the position illustrated in the drawing, the left-hand bucket 30 is in position to receive bulk material, and the other limiting position of the bucket assembly is reached when the right-hand bucket 30 is over the scale platform 11 occupying the illustrated position of the left-hand bucket 30.

The means for effecting lateral movement of the buckets 30 comprises a motor means which is herein illustrated as a hydraulic cylinder 60 containing a piston to which is connected a piston rod 61 secured to a threaded boss 62 on the bucket assembly. A suitable source of hydraulic fluid is provided and is connected by lines 63 to an adjustable metering valve 64 which connects to lines 65 and 66 for supplying fluid under pressure to the cylinder 60 at a rate controlled by the valve 64.

Mounted on the supporting structure 40 is a vibrating feed trough 70 which includes a solenoid 71. The feed trough 70 is of standard type purchased on the open market an the details of its construction form no part of the present invention. It may be said, however, that the device operates by high frequency actuation of the solenoid 71 causing movement of the trough 70 in one direction accompanied by a slow return of the trough due to the spring mounting of the structure. This device is adjustable so as to control the rate of deposit of bulk material therefrom. Illustrated at 75 in Figure 1 is the discharge opening of an elevator, by means of which bulk material is fed into the trough 70, and the elevator 75 will normally be provided with means for controlling its speed so as to regulate the rate of deposit of the bulk material into the vibrating trough 70.

Mounted on the frame 40 are a pair of posts 80 carrying limit switches 81a and 81b including actuators 82 in position to be engaged by the appropriate one of the buckets 30.

The weighing mechanism may also be of standard type and includes a movable pointer 85 which moves over a graduated scale in known manner. In order that the weighing device or scale may control the operation of the weighing machine without imposing a load on the weighing platform 11, a magnetic switch indicated in Figure 2 is provided. Conveniently, this switch may include a permanent magnet 86 carried by the pointer 85 and a switch device 87 which includes a movable element moved into circuit closing relationship when the magnet 86 is brought into proximity to the switch.

The platform 11 may, if desired, be provided with a light angle iron 90 (see Figure 3) serving to close off the space between the bottom of the buckets 30 and the upper surface of the platform of the scale. However, these angle pieces 90 are out of contact with the side walls of the buckets 30 and constitute a negligible load on the platform 11.

It will be observed that movement of the scraper blade 50 as a result of lateral movement of the buckets 30 across the upper surface of the platform 11 results in a tipping of the blade 50 into a position in which its side surface contacts the lower edge of the bucket wall 31 of the bucket which is in position to be filled. Further, the inclination of the scraper blade 50 during lateral movement of the buckets 30 provides a most efficient scraping action across the upper surface of the platform 11 since a sharp lower corner of the scraper blade 50 will thereby be brought into contact with the surface of the platform.

Since the only movable element which engages the platform 11 is the relatively light scraper blade 50, a very efficient weighing action is obtained. Compensation is made for the weight of the scraper blade 50 and no other compensation need be regarded. Accordingly, a very accurate weighing of bulk material deposited on the platform 11 is obtained, and the buckets 30 may be modified or replaced without the necessity of compensating for any changes in their weight.

The magnetic switch 87 is connected to a suitable relay actuating a control valve in the hydraulic system so as to effect lateral movement of the buckets 30 immediately upon attainment of a predetermined weight as determined by the weighing device 11. Furthermore, the switch 87 controls a circuit to the solenoid 71 of the vibrating trough so that vibration and hence the feeding action of the trough is discontinued immediately upon attainment of the predetermined weight of bulk material on the platform 11. The vibrating trough 70 has the property of immediately discontinuing feeding when the solenoid 71 is deenergized. The average rate of discharge from the elevator 75 into the trough 70 is of course controlled in accordance with the average rate of passage of material through the weighing machine proper. Limit switches 81 are connected to the relay system actuating the hydraulic piston cylinder and serve when actuated to set up suitable control circuits for effecting reverse lateral movement of the buckets upon the next closure of the magnetic switch 87.

As best seen in Figure 4, a suitable electric circuit for controlling the mechanism to attain the functions described above is illustrated in simplified form. According to this figure limit switches 81a and 81b are each connected in series across the line with control relays 90 and 92 respectively. Switch 87 is connected across the line in series with a control relay 94. The relay 90 controls normally open contacts 90a and 90b. Control relay 92 controls normally open contacts 92a and 92b. Control relay 94 controls normally closed contact 94a and normally open contacts 94b and 94c. Contacts 90a and 92a are connected in parallel and together are in series with the solenoid 71 of the vibratory feed device, and normally closed contact 94a is also in series with the solenoid 71. Contacts 90b and 94b are in series with one solenoid 96 associated with the reversing valve 98 which controls the direction of flow of fluid through hydraulic lines 65 and 66. Contacts 92b and 94c are in series with the other solenoid 100 of the valve 98.

The operation of the mechanism is believed apparent from the foregoing but will be briefly reviewed. Assume that one of the limit switches, as for example 81a, is closed and that solenoid 71 is energized so that bulk material is being fed into one of the buckets.

At this time limit switch 81b and the switch 87 controlled by the pointer of the weighing mechanism are open. Since control relay 90 is energized, normally open contact 90a is closed and a circuit is completed through the vibrator solenoid 71 through the normally closed contact 94a. At this time normally open contact 90b is closed but the circuit to the solenoid 90 is open at contacts 94b. Upon attainment of a predetermined weight of material on the platform the switch 87 closes energizing relay 94 and thus immediately opening normally closed contact 94a which instantly terminates operation of the vibratory feed mechanism. At the same time normally open contacts 94b and 94c are closed. Since normally open contact 90b was closed under the conditions assumed, a current is completed through solenoid 96 thus reversing the valve 98. The effect of this is to cause the buckets to traverse from one limiting position to the other. As this traverse starts limit switch 81a opens, thus de-energizing solenoid 90 and opening contacts 90a and 90b. Opening of contact 90b does not affect the reversing valve since the valve has been shifted to reverse position previously. During traverse of the buckets from one position to the other switch 87 opens, permitting normally closed switch 94a to close.

However, at this time contacts 90a and 92a both remain open since both limit switches are open. At the same time, opening of switch 87 opens contacts 94b and 94c which is without immediate effect. When the buckets reach the other limiting position limit switch 31b is closed, thus energizing control relay 92. This results in closing normally open contact 92a which completes a circuit through the vibrator solenoid 71 and normally closed contact 94a thus initiating the feeding cycle. At the same time contact 92b closed, thus completing a circuit to open contact 94c. This latter contact will be closed when switch 87 is closed which concludes a cycle.

The use of the metering valve 64 in the hydraulic system is of considerable importance in the present machine. It will ordinarily be set to effect a relatively rapid traverse of the buckets 30 so as to quickly discharge the weighed material from the platform 11, at which time it falls into the hopper 20 and is discharged through the spout connected to the bottom opening 22 therein. However, in the event that a relatively dense material, such for example as sugar or rice, has been weighed on the platform 11 it is desirable to effect a slower lateral movement of the buckets so as to obtain a gradual discharge of the weighed material from the hopper 20. Otherwise a too rapid discharge of heavy bulk material might under some conditions, such for example as discharge of the material into paper bags, be highly undesirable.

The vibrating trough 70 is provided with adjustable means for effecting vibration thereof so as to control the rate of discharge of bulk material therefrom into the appropriate one of the buckets 30. By a judicious selection of the rate of feeding effected by the trough 70 and the rate of lateral movement effected by the hydraulic cylinder 60, maximum output may be obtained without at the same time leading to undesirable dumping of heavy masses of weighed material, as previously described.

The present machine is adaptable for weighing substantially any type of dry bulk material, such for example as potato chips, sugar, dried vegetables such as rice, beans or the like, dried fruit, chemicals, and in fact any material capable of being handled by the vibrating trough 70 and being contained by the open-bottomed buckets 30 in conjunction with the weighing platform 11.

The present machine may advantageously be employed in simultaneously mixing and weighing different commodities, such for example as mixed seed. In such case a plurality of elevators 75 may be employed, each of which elevates a particular type of seed and deposits into the vibrating trough. The portions of the ingredients of the final mixture may be controlled, as is obvious, by varying the rate of speed of the elevators.

While the open-bottomed buckets illustrated and described above have proved to be perfectly satisfactory for all materials, it is within the purview of the present invention that these buckets be formed with downwardly and outwardly flaring walls if such construction is found necessary due to the nature of the materials being weighed.

The drawings and the foregoing specification constitute a description of the improved weighing machine in such full, clear, concise and exact terms as to enable any person skilled in the art to practice the invention, the scope of which is indicated by the appended claims.

What we claim as our invention is:

1. A machine for weighing and discharging batches of bulk material comprising a weighing platform, an open bottomed bucket, support means independent of said weighing platform for supporting said bucket with its lower edge spaced slightly above said platform for sliding movement between a weighing position directly over said platform and a discharge position at one side of said platform, feed means directly above said platform for discharging bulk material into said bucket and onto said platform when said bucket is in weighing position, power means for shifting said bucket between weighing and discharge positions, and control means responsive to a predetermined weight of bulk material on said platform to terminate operation of said feeding means and to cause said power means to shift said bucket from weighing position.

2. A machine as defined in claim 1 in which the side walls of said bucket are vertical so that the entire weight of bulk material within said bucket is supported by said platform.

3. A machine as defined in claim 1 comprising in addition a light scraper blade loosely carried by said bucket and movable across the top of said platform upon shifting of said bucket.

4. A machine as defined in claim 1 comprising in addition adjustable speed control means for said power means to selectively control the rate of discharge of bulk material.

5. A machine for weighing and discharging batches of bulk material comprising a weighing platform, a pair of interconnected open bottomed buckets, support means independent of said weighing platform for supporting said buckets with their lower edges spaced slightly above said platform for lateral sliding movement between a first position in which one of said buckets is in weighing position directly above said platform and the other bucket is in a discharge position at one side of said platform, and a second position in which said one bucket is in discharge position and said other bucket is in weighing position, feed means directly above said platform for discharging bulk material into the bucket in weighing position over said platform, power means for shifting said buckets between said first and second position, and control means responsive to a predetermined weight of bulk material on said platform to terminate operation of said feeding means and to cause said power means to shift said buckets from one position to the other.

6. A machine as defined in claim 5 in which the side walls of said buckets are vertical so that the entire weight of the bulk material within the bucket over the platform is supported by said platform.

7. A machine as defined in claim 5 in which said buckets are injuxtaposition and have a flat, common inner wall, the direction of shifting movement of said buckets by said power means being generally perpendicular to said wall.

8. A machine as defined in claim 7 in which said common inner wall is double and provides an interior space, and a scraper blade loosely mounted in the space and movable across the top of said platform upon shifting of said buckets.

9. A machine as defined in claim 8, said blade being of less thickness than the width of said space, whereby said blade is inclined and presents a bottom corner as it is scraped across said platform.

10. A machine as defined in claim 5 comprising in addition adjustable speed control means for said power means to selectively control the rate of discharge of bulk material.

11. A machine as defined in claim 5 in which said feed means is a vibratory trough effective when de-energized to stop feed of bulk material substantially instantaneously.

12. A machine as defined in claim 5 in which said power means is a hydraulic piston and cylinder device.

13. A machine as defined in claim 5 in which said support means comprises a pair of spaced parallel rails, and means on said buckets slidable on said rails.

14. A machine as defined in claim 5 comprising in addition an indicating pointer movable by movement of said weighing platform, and said control means comprises a switch operable by movement of said pointer, and means controlled by said switch for interrupting operation of said feed means and actuating said power means upon closure of said switch.

15. A machine as defined in claim 14 in which said switch is magnetically operable, and said pointer carries a magnet movable in a path adjacent said switch.

16. A machine as defined in claim 14 in which said control means comprises in addition a pair of limit switches actuated by said buckets at either limit of shifting movement thereof.

17. A machine as defined in claim 16 comprising in addition means operable by closure of either limit switch to initiate operation of said feed means.

GUSTAV A. OLOFSSON.
LOYDE N. CHUBB.

REFERENCES CITED

The following references are of record in the file of this patent:

UNITED STATES PATENTS

| Number | Name | Date |
| --- | --- | --- |
| 441,302 | Harmless | Nov. 25, 1890 |
| 683,304 | Lemon | Sept. 24, 1901 |
| 706,442 | McLeod et al. | Aug. 5, 1902 |
| 1,321,726 | Ellis | Nov. 11, 1919 |
| 2,033,586 | Noble | Mar. 10, 1936 |

FOREIGN PATENTS

| Number | Country | Date |
| --- | --- | --- |
| 364,942 | Germany | Sept. 11, 1920 |